United States Patent
Hong

(10) Patent No.: US 11,817,967 B2
(45) Date of Patent: Nov. 14, 2023

(54) NETWORK ACCESS METHOD AND APPARATUS, AND STORAGE MEDIUM

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 354 days.

(21) Appl. No.: 17/279,910

(22) PCT Filed: Sep. 29, 2018

(86) PCT No.: PCT/CN2018/108761
§ 371 (c)(1),
(2) Date: Mar. 25, 2021

(87) PCT Pub. No.: WO2020/062164
PCT Pub. Date: Apr. 2, 2020

(65) Prior Publication Data
US 2021/0377067 A1 Dec. 2, 2021

(51) Int. Cl.
*H04W 4/00* (2018.01)
*H04L 12/28* (2006.01)
(Continued)

(52) U.S. Cl.
CPC ...... *H04L 12/2856* (2013.01); *H04L 12/2807* (2013.01); *H04W 4/80* (2018.02);
(Continued)

(58) Field of Classification Search
CPC ....... H04W 4/80; H04W 48/16; H04W 74/08; H04W 74/0833; H04W 40/24; H04L 12/28; H04L 12/2856; H04L 12/2807
(Continued)

(56) References Cited

U.S. PATENT DOCUMENTS

2010/0202345 A1* 8/2010 Jing ............... H04W 16/18
370/328
2012/0317619 A1* 12/2012 Dattagupta ........... H04W 12/50
726/4
(Continued)

FOREIGN PATENT DOCUMENTS

EP 3860224 A1 * 8/2021 ......... H04L 12/2807
WO WO 2013052865 A1 4/2013

OTHER PUBLICATIONS

Extended European Search Report in European Application No. 18935962.3, dated Apr. 25, 2022.
Examination Report for Indian Application No. 202147018591, dated May 9, 2022.

*Primary Examiner* — Marceau Milord
(74) *Attorney, Agent, or Firm* — Finnegan, Henderson, Farabow, Garrett & Dunner, L.L.P.

(57) ABSTRACT

The present disclosure relates to a network access method, which belongs to the technical field of smart homes. The method includes: after short-distance wireless communication is established between a smart home device and a terminal, the terminal receiving access requirement information transmitted by the smart home device; the terminal determining a target base station according to the access requirement information; the terminal transmitting access information for accessing the target base station to the smart home device; and the smart home device initiating a random access to the target base station according to the access information, such that the smart home device accesses a cellular mobile network.

15 Claims, 7 Drawing Sheets

(51) Int. Cl.
*H04W 4/80* (2018.01)
*H04W 40/24* (2009.01)
*H04W 48/16* (2009.01)
*H04W 74/08* (2009.01)
*H04W 76/14* (2018.01)

(52) U.S. Cl.
CPC .......... *H04W 40/24* (2013.01); *H04W 48/16* (2013.01); *H04W 74/0833* (2013.01); *H04W 76/14* (2018.02)

(58) Field of Classification Search
USPC ................................................ 370/329, 255
See application file for complete search history.

(56) References Cited

U.S. PATENT DOCUMENTS

| | | | |
|---|---|---|---|
| 2013/0055363 A1* | 2/2013 | Dattagupta | H04L 63/0853 709/229 |
| 2013/0089001 A1* | 4/2013 | Dattagupta | H04W 48/20 370/255 |
| 2017/0013445 A1* | 1/2017 | Raman | H04L 63/1458 |
| 2017/0013447 A1* | 1/2017 | Raman | H04W 12/50 |
| 2017/0013448 A1* | 1/2017 | Raman | H04L 63/101 |
| 2017/0013449 A1* | 1/2017 | Raman | H04W 12/06 |
| 2017/0289882 A1* | 10/2017 | Faccin | H04W 36/0066 |
| 2019/0097715 A1* | 3/2019 | Maldonado | H04B 7/0814 |
| 2019/0260496 A1* | 8/2019 | Emmanuel | H04L 1/0009 |
| 2019/0320494 A1* | 10/2019 | Jayawardene | H04L 5/0041 |

* cited by examiner

NETWORK ACCESS METHOD AND APPARATUS, AND STORAGE MEDIUM

CROSS REFERENCE TO RELATED APPLICATIONS

This application is a national phase application based on International Application No. PCT/CN2018/108761, filed Sep. 29, 2018, the content of which is incorporated herein by reference.

TECHNICAL FIELD

The present disclosure relates to a field of smart home technology, and more particularly to a method for accessing a network, an apparatus for accessing a network, and storage medium.

BACKGROUND

With development of network technologies, more and more smart home devices have functionalities of accessing the Internet, so as to perform information interaction with other devices or servers via the Internet.

In the related art, the smart home device usually accesses the Internet via a wireless local area network (WLAN). For example, the smart home device searches for a wireless access point (such as a router or a terminal having a wireless hotspot function enabled) in a nearby area, and sends a connection request to the wireless access point to establish a wireless-fidelity (Wi-Fi) connection with the wireless access point. When the connection is established successfully and the wireless local area network of the wireless access point accesses to the Internet, the smart home device may perform information interaction with devices at the Internet via the wireless access point.

SUMMARY

According to a first aspect of the present disclosure, a method for accessing a network is provided. The method includes establishing a short-distance wireless communication connection between a smart home device and a terminal, sending by the smart home device access requirement information to the terminal via the short-distance wireless communication connection, wherein the access requirement information indicates a condition met by a base station to be accessed by the smart home device, determining by the terminal a target base station based on the access requirement information, acquiring by the terminal access information for accessing the target base station, sending by the terminal the access information to the smart home device and initiating by the smart home device a random access to the target base station based on the access information.

According to a second aspect of the present disclosure, a method for accessing a network is provided. The method is executed by a smart home device. The method includes establishing a short-distance wireless communication connection with a terminal, sending access requirement information to the terminal via the short-distance wireless communication connection, wherein the access requirement information indicates a condition met by a base station to be accessed by the smart home device, receiving access information for accessing a target base station sent by the terminal, wherein the target base station is a base station determined by the terminal based on the access requirement information, and initiating a random access to the target base station based on the access information.

According to a third aspect of the present disclosure, a method for accessing a network is provided. The method is executed by a terminal. The method includes establishing a short-distance wireless communication connection with a smart home device, receiving access requirement information sent by the smart home device via the short-distance wireless communication connection, wherein the access requirement information indicates a condition met by a base station to be accessed by the smart home device, determining a target base station based on the access requirement information, acquiring access information for accessing the target base station, and sending the access information to the smart home device so that the smart home device initiates a random access to the target base station based on the access information.

According to a fourth aspect of the present disclosure, an apparatus for accessing a network is provided. The apparatus is applicable to a smart home device and includes an establishing module, an access requirement information sending module, an access information receiving module and a random access initiating module. The establishing module is configured to establish a short-distance wireless communication connection with a terminal. The access requirement information sending module is configured to send access requirement information to the terminal via the short-distance wireless communication connection, wherein the access requirement information indicates a condition met by a base station to be accessed by the smart home device. The access information receiving module is configured to receive access information for accessing a target base station sent by the terminal, wherein the target base station is a base station determined by the terminal based on the access requirement information. The random access initiating module is configured to initiate a random access to the target base station based on the access information.

According to a fifth aspect of the present disclosure, an apparatus for accessing a network is provided. The apparatus is applicable to a terminal and includes an establishing module, an access requirement information receiving module, a target base station determining module, an access information acquiring module and an access information sending module. The establishing module is configured to establish a short-distance wireless communication connection with a smart home device. The access requirement information receiving module is configured to receive access requirement information sent by the smart home device via the short-distance wireless communication connection, wherein the access requirement information indicates a condition met by a base station to be accessed by the smart home device. The target base station determining module is configured to determine a target base station based on the access requirement information. The access information acquiring module is configured to acquire access information for accessing the target base station. The access information sending module is configured to send the access information to the smart home device so that the smart home device initiates a random access to the target base station based on the access information.

According to a sixth aspect of the present disclosure, an apparatus for accessing a network is provided. The apparatus is applicable to a smart home device and includes a processor and memory configured to store instructions executable by the processor. The processor is configured to establish a short-distance wireless communication connection with a terminal, send access requirement information to the terminal via the short-distance wireless communication connection, wherein the access requirement information indicates a condition met by a base station to be accessed by the smart home device, receive access information for accessing a target base station sent by the terminal, wherein the target base station is a base station determined by the terminal based on the access requirement information, and initiate a random access to the target base station based on the access information.

According to a seventh aspect of the present disclosure, an apparatus for accessing a network is provided. The apparatus is applicable to a terminal and includes a processor and memory configured to store instructions executable by the processor. The processor is configured to establish a short-distance wireless communication connection with a smart home device, receive access requirement information sent by the smart home device via the short-distance wireless communication connection, wherein the access requirement information indicates a condition met by a base station to be accessed by the smart home device, determine a target base station based on the access requirement information, acquire access information for accessing the target base station, and send the access information to the smart home device so that the smart home device initiates a random access to the target base station based on the access information.

According to an eighth aspect of embodiments of the present disclosure, a network access system is provided. The system includes a smart home device and a terminal. The smart home device includes the apparatus for accessing a network according to the fourth aspect or any alternative implementation of the fourth aspect. The terminal includes the apparatus for accessing a network according to the fifth aspect or any alternative implementation of the fifth aspect.

According to a ninth aspect of embodiments of the present disclosure, a computer-readable storage medium is provided. The computer-readable storage medium has executable instructions stored therein. A processor in a terminal invokes the executable instructions to implement the method for accessing a network according to the second aspect or any alternative implementation of the second aspect.

According to a tenth aspect of embodiments of the present disclosure, a computer-readable storage medium is provided. The computer-readable storage medium has executable instructions stored therein. A processor in a terminal invokes the executable instructions to implement the method for accessing a network according to the third aspect or any alternative implementation of the third aspect.

The technical solution according to embodiments of the present disclosure may include the following beneficial effects.

After the short-distance wireless communication is established between the smart home device and the terminal, the terminal receives the access requirement information sent by the smart home device, determines the target base station based on the access requirement information and sends the access information for accessing the target base station to the smart home device, the smart home device initiates the random access to the target base station based on the access information such that the smart home device may access the cellular mobile network. In the present disclosure, the terminal provides the access information for accessing the base station to the smart home device, so that the smart home device may initiate the random access to the base station, and information interaction may be realized between the smart home device and the base station via the cellular mobile communication mode, thus meeting a communication requirement of the smart home device.

It should be understood that the above general description and the following details are explanatory and illustrative, and shall not be construed to limit the present disclosure.

BRIEF DESCRIPTION OF THE DRAWINGS

The accompanying drawings are incorporated into the disclosure as one part therein to illustrate embodiments of the present disclosure. The accompanying drawings together with the specification explain the principle of the present disclosure.

DETAILED DESCRIPTION

Figure 1:
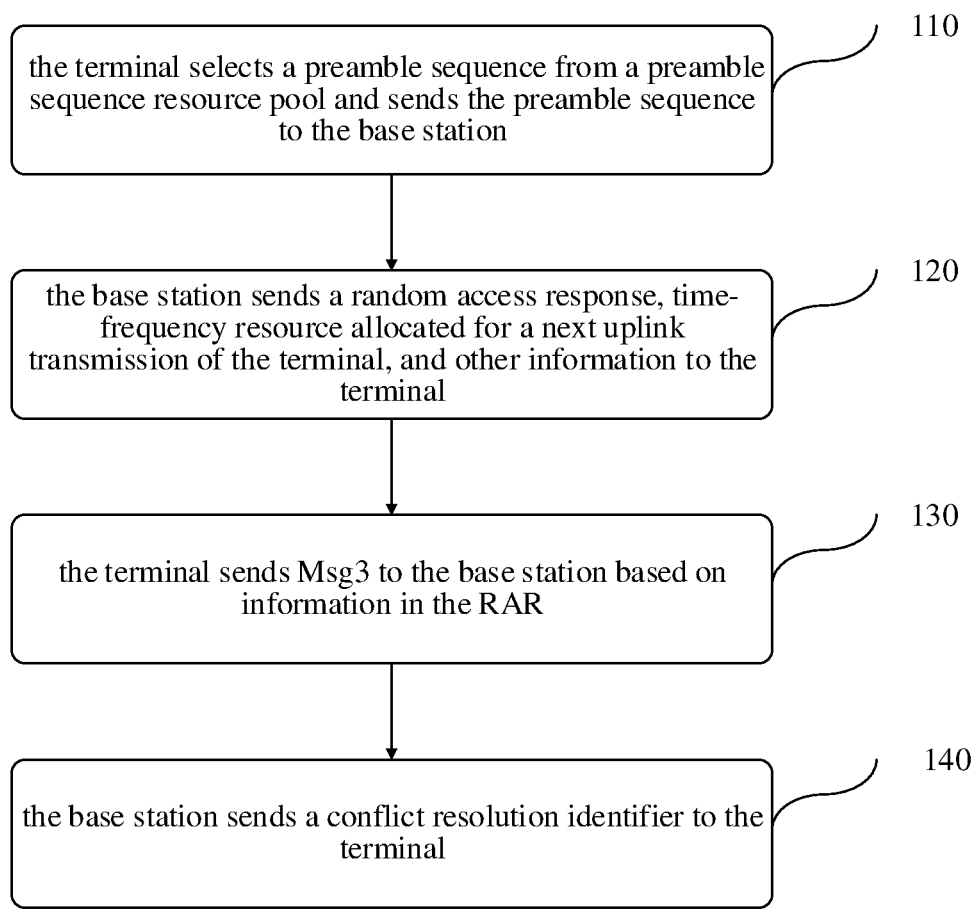
FIG. 1 is a flowchart illustrating a random access procedure involved in an example embodiment.

Reference will be made in detail to embodiments of the present disclosure. Throughout the descriptions with reference to the accompanying drawings, unless specified or limited otherwise, the same or similar elements and the elements are denoted by the same reference numeral in different drawings. The implementations described in the following embodiments shall not be construed to represent all implementations of the present disclosure. Rather, they are merely some examples of the apparatus and method according to some aspects of the present disclosure, as described in the claims.

The technical solution of the present disclosure may be applied in a scene of establishing a wireless connection between a smart home device and a network in daily life. For ease of understand, some terms involved in the embodiments of the present disclosure will be described in brief as follows.

Out-of-band communication, generally, data transmitted in an out-of-band communication mode may be referred as out of band (OOB). OOB transport layer protocol uses the out of band to send some particular data. For example, when a first communication user has important data to be transmitted to a second user, the protocol may send the data to the opposite party quickly. In order to effectively and safely send the data, the protocol typically uses different channel from general data, i.e., using additional communication channel. It can be easily seen that, in this way, the data is not easily to be blocked, such that the data can be transmitted quickly and conveniently. In the embodiments of the present disclosure, the out-of-band communication mode refers to any communication mode other than the cellular mobile communication mode, includes but is not limited to near field communication (NFC), Bluetooth, encoded image recognition and so on.

Random access, in the related art, the random access refers to a procedure starting from sending a preamble code of the random access by a terminal to try to connect with a base station to establishing a signaling connection with the base station after the terminal and the base station/cell realize synchronization in the cellular mobile communication.

Before the random access procedure begins, the base station sends configuration information of the random access procedure to the terminal, and the terminal performs the random access procedure based on the received configuration information. In detail, the random access procedure typically includes a competition-based random access procedure and a non-competition-based random access procedure. Taking the competition-based random access procedure as an example, with reference to FIG. 1, FIG. 1 illustrates a flowchart illustrating a random access procedure involved in an example embodiment.

As illustrated in FIG. 1, in step 110, the terminal selects a preamble sequence (also called as preamble code) from a preamble sequence resource pool and sends the preamble sequence to the base station. A message containing the preamble code can also be called a message 1 (Msg1). The base station may perform correlation detection on a received signal to recognize the preamble sequence sent from the user.

In step 120, the base station sends a random access response (RAR) to the terminal. The RAR may also be called as message 2 (Msg2). The RAR contains an identification of the preamble sequence of random access, a timing advance command determined based on a time delay estimation between the base station and the terminal, a temporary cell-radio network temporary identifier (TC-RNTI), time-frequency resource allocated for a next uplink transmission of the terminal, and other information.

In step 130, the terminal sends a message 3 (Msg3) to the base station based on information in the RAR. The Msg3 contains a terminal identifier, a radio resource control (RRC) linkage request, and other information. The terminal identifier may be a unique identifier corresponding to the terminal.

In step 140, the base station sends a conflict resolution identifier (also called as Msg4) containing the terminal identifier of the terminal outplaying others in the conflict resolution to the terminal. If the terminal detects the identifier of itself, the terminal upgrades the TC-RNTI to a cell-radio network temporary identifier (C-RNTI), sends an acknowledgement (ACK) signal to the base station to complete the random access procedure, and waits to be scheduled by the base station.

It should be noted that, in the above block 120, the random access response is sent in a physical downlink shared channel between the terminal and the base station. During transmission of the random access response, the base station uses a random access-radio network temporary identifier (RA-RNTI) to scramble a physical downlink control channel corresponding to the physical downlink shared channel. The RA-RNTI has a one-to-one correspondence with the time-frequency resource occupied by transmission of the preamble sequence and detected by the base station. In this case, the terminal may calculate the corresponding RA-RNTI and uses the RA-RNTI to descramble the physical downlink control channel to further detect the random access response.

For the non-competition-based random access procedure, since the base station knows the terminal identifier, the base station may allocate the preamble sequence for the terminal. Thus, when the terminal sends the preamble sequence, the terminal needs not to randomly select the sequence, but uses the preamble sequence allocated by the base station. After the base station detects that the preamble sequence is allocated, the base station may send a corresponding random access response, containing timing advance information, uplink resource allocation information and other information. The terminal determines that the access is completed after receiving the random access response, and waits to be scheduled by the base station. Therefore, the non-competition-based random access procedure includes merely two steps: step in step 110 in which the preamble sequence is sent, and step in step 120 in which the random access response is sent.

Figure 2:
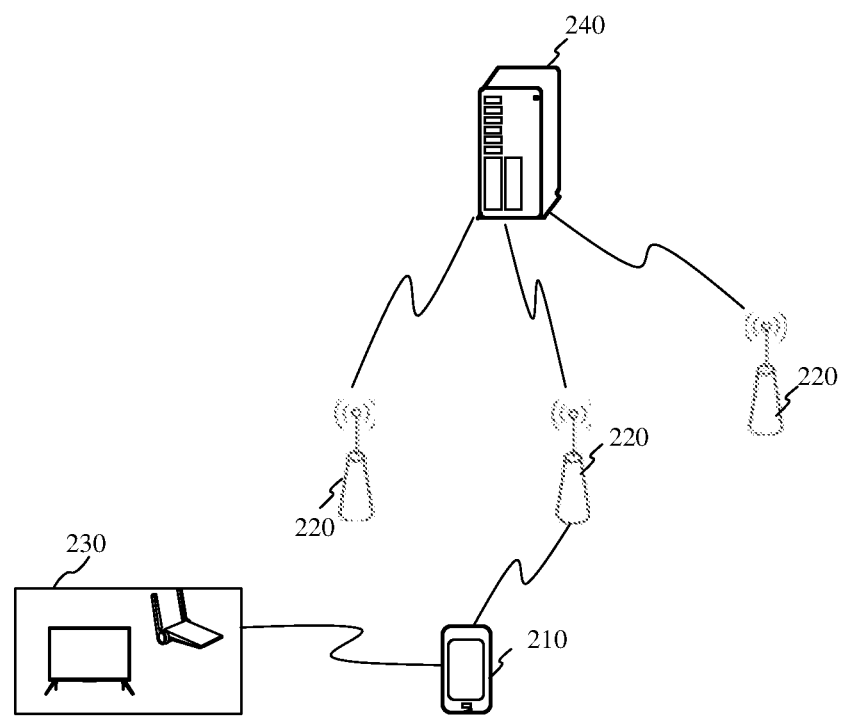
FIG. 2 is a schematic diagram illustrating a network connection of a smart home device involved in an example embodiment.

With reference to FIG. 2, FIG. 2 illustrates a schematic diagram illustrating a network connection of a smart home device involved in an example embodiment. As illustrated in FIG. 2, there are a terminal 210, several base stations 220 and several smart home devices 230.

The terminal 210 is a terminal having a cellular mobile communication capacity. The terminal 210 may communicate with one or more core networks via a radio access network (RAN). The terminal 210 may be a mobile terminal, such as a mobile phone (or referred as "cellular" phone), and a computer having the mobile terminal, for example, a portable, pocket, handheld, computer built-in or vehicle-mounted mobile device, such as station (STA), mobile, remote station, access point, remote terminal, access terminal, user terminal, user agent, user device, or user equipment. Or, the terminal 210 may also be a device of an unmanned aerial vehicle.

The base station 220 may a network device in a wireless communication system. The wireless communication system may be the $4^{th}$ generation mobile communication (4G) system (also called as long term evolution system), or the 5G system (also called as new radio system). Or the wireless communication system may a next generation system of the 5G system.

The base station 220 may be an evolved node base station (eNB) adopted in the 4G system, or a next generation node base station (gNB) which adopts a centralized-distributed architecture in the 5G system. When the base station 220 adopts the centralized-distributed architecture, the base station 220 typically includes a central unit (CU) and at least two distributed units (DUs). The central unit is provided with a protocol stack including a packet data convergence protocol (PDCD) layer, a radio link control (RLC) layer, a media access control (MAC) layer. The distributed unit is provided with a protocol stack including a physical (PHY) layer. A detailed implementation of the base station 220 is not limited in the embodiments of the present disclosure.

A wireless connection can be established between the base station 220 and the terminal 210 via the wireless radio. In different implementations, the wireless radio is a wireless radio based on a 4G standard. Or the wireless radio is a wireless radio based on a 5G standard, for example, the wireless radio is the new radio. Or the wireless radio may also be a wireless radio based on a next generation mobile communication network technology standard of the 5G.

Optionally, the above wireless communication system may further include a network management device 240.

The several base stations 220 are coupled to the network management device 240, respectively. The network management device 240 may be a core network device in the wireless communication system. For example, the network management device 240 may be a mobility management entity (MME) in an evolved packet core (EPC) network. Or the network management device may also be another core network device, such as a serving gateway (SGW), a public data network gateway (PGW), a policy and charging rules function (PCRF) unit, or a home subscriber server (HSS), etc. An implementation of the network management device 240 is not limited in the embodiments of the present disclosure.

The smart home device 230 may include, but be not limited to, a fixedly installed device or a small scope movable device, such as a camera, a sensor (such as an infrared sensor, a light sensor, a vibration sensor, a sound sensor and so on), a smart TV, a smart robot, a smart loudspeaker box, a smart refrigerator, a smart air conditioner, a smart rice cooker, a water purifier and so on. Or the smart home device 230 may also be a mobile device, such as a moving picture experts group audio layer III (MP3), an MP4, a smart Bluetooth earphone.

In the related art, an information interaction between the smart home device 230 and a network may be realized by establishing a Wi-Fi connection between the smart home device 230 and a WLAN access point (such as a router, or a terminal 210 having a wireless hotpot function enabled). Since the Wi-Fi connection has a poor stability, data transmission between the smart home device 230 and the network may be affected, such that a communication requirement of the smart home device which has high requirements on time delay and reliability cannot be met. In order to solve the problem existing in the related art, the present disclosure provides a method for accessing a network, which may allow the smart home device to access the cellular mobile network.

Figure 3:
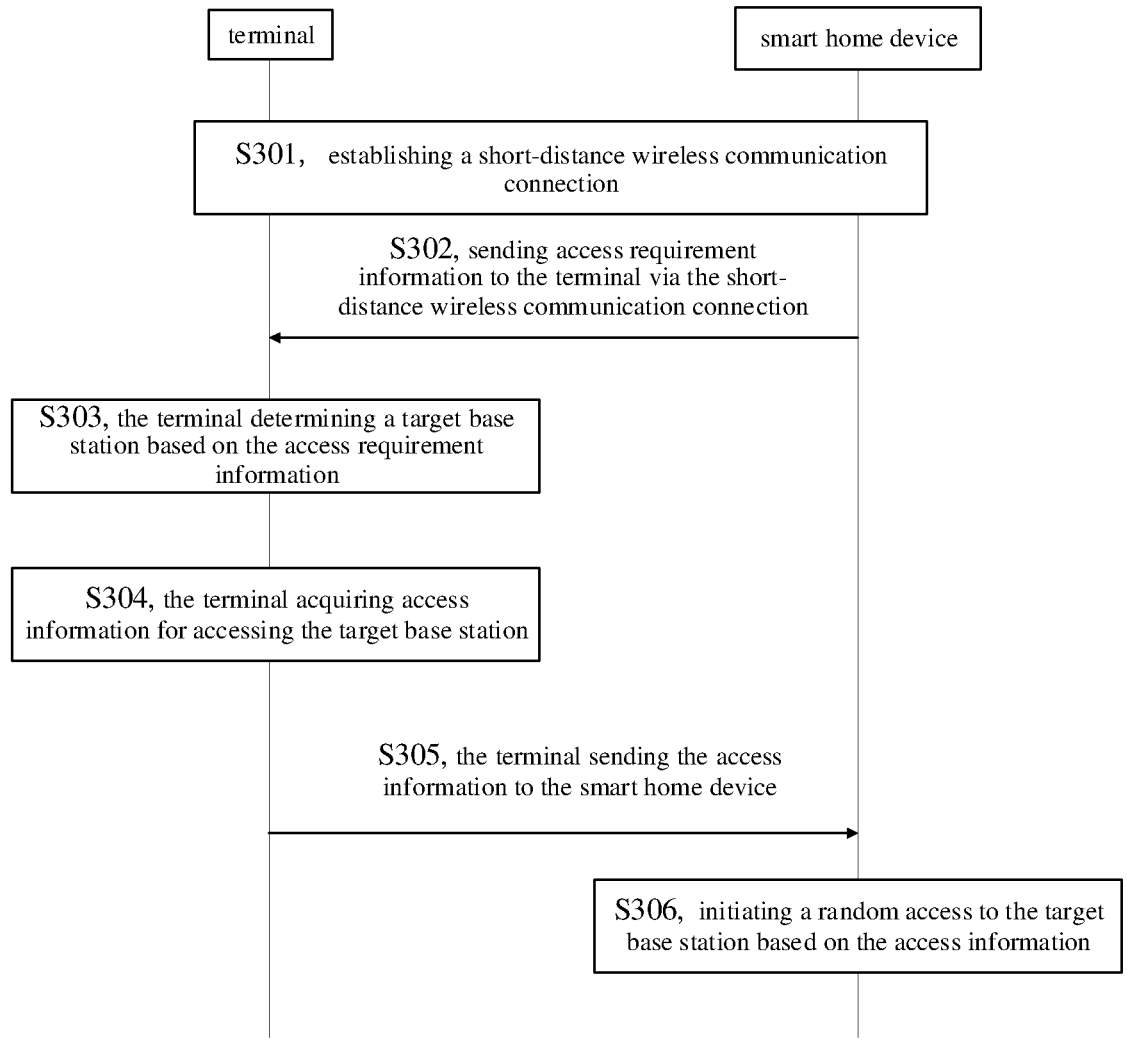
FIG. 3 is a flowchart illustrating a method for accessing a network according to an example embodiment.

With reference to FIG. 3, FIG. 3 is a flowchart illustrating a method for accessing a network according to an example embodiment. As illustrated in FIG. 3, the method for accessing a network may be applied in the system structure shown in FIG. 2. The method may include the followings.

In step 301, a short-distance wireless communication connection is established between a smart home device and a terminal.

In step 302, the smart home device sends access requirement information to the terminal via the short-distance wireless communication connection.

The access requirement information is configured to indicate a condition met by a base station to be accessed by the smart home device.

In step 303, the terminal determines a target base station based on the access requirement information.

In step 304, the terminal acquires access information for accessing the target base station.

In step 305, the terminal sends the access information to the smart home device.

In step 306, the smart home device initiates a random access to the target base station based on the access information.

In conclusion, after the short-distance wireless communication is established between the smart home device and the terminal, the terminal receives the access requirement information sent by the smart home device, determines the target base station based on the access requirement information and sends the access information for accessing the target base station to the smart home device, the smart home device initiates the random access to the target base station based on the access information such that the smart home device may access the cellular mobile network. In the present disclosure, the terminal provides the access information for accessing the base station to the smart home device, so that the smart home device may initiate the random access to the base station, and information interaction may be realized between the smart home device and the base station via the cellular mobile communication mode, thus meeting a communication requirement of the smart home device.

Figure 4:
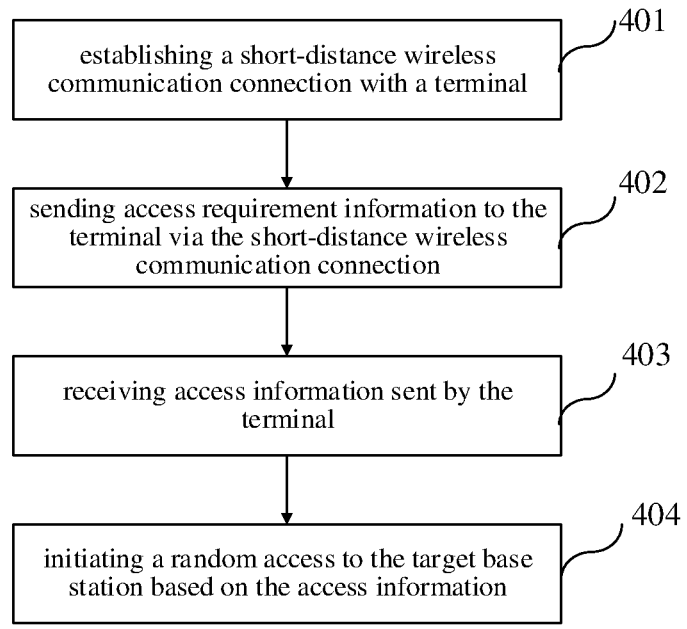
FIG. 4 is a flowchart illustrating a method for accessing a network according to an example embodiment.

With reference to FIG. 4, FIG. 4 is a flowchart illustrating a method for accessing a network according to an example embodiment. As illustrated in FIG. 4, the method for accessing a network may be applied in the system shown in FIG. 2 and executed by the smart home device 230 in FIG. 2. The method may include the followings.

In step 401, a short-distance wireless communication connection is established with a terminal.

In step 402, access requirement information is sent to the terminal via the short-distance wireless communication connection.

The access requirement information is configured to indicate a condition met by a base station to be accessed by the smart home device.

In step 403, access information sent by the terminal is received.

The access information is used to access a target base station. The target base station is a base station determined by the terminal based on the access requirement information.

In step 404, a random access is initiated toward the target base station based on the access information.

Optionally, the smart home device may establish the short-distance wireless communication connection with the terminal as follows. An identification of the smart home device and connection verification information are provided to the terminal via an out-of-band communication mode. The out-of-band communication mode includes any communication mode other than the cellular mobile communication mode. When a connection request containing the connection verification information sent by the terminal is received, the short-distance wireless communication connection is established with the terminal.

Optionally, the identification of the smart home device and the connection verification information can be provided to the terminal via the out-of-band communication mode as follows. The smart home device sends the identification of the smart home device and the connection verification information to the terminal via a near field communication (NFC) or Bluetooth (BT). Or the smart home device displays an encoded image containing the connection verification information so that the terminal may recognize the encoded image to obtain the identification of the smart home device and the connection verification information.

Optionally, the access requirement information can be sent to the terminal via the short-distance wireless communication connection as follows. When detecting that the short-distance wireless communication connection is established, an access information acquiring request is sent to the terminal. The access information acquiring request contains the access requirement information.

Optionally, the access requirement information includes at least one of a business type of the smart home device, a quality of service (QoS) requirement of the smart home device and a type of a network accessible by the smart home device.

Optionally, the access information contains a preamble code of the random access and a safety secret key for establishing a connection channel with a core network. Or the access information contains a preamble code of the random access.

In conclusion, after the short-distance wireless communication is established between the smart home device and the terminal, the smart home device sends the access requirement information to the terminal, and initiates the random access to the target base station based on the access information after receiving the access information fed back by the terminal in response to the access requirement information, such that the smart home device may access the cellular mobile network. In the present disclosure, the terminal provides the access information for accessing the base station to the smart home device, so that the smart home device may initiate the random access to the base station, and information interaction may be realized between the smart home device and the base station via the cellular mobile communication mode, thus meeting a communication requirement of the smart home device.

Figure 5:
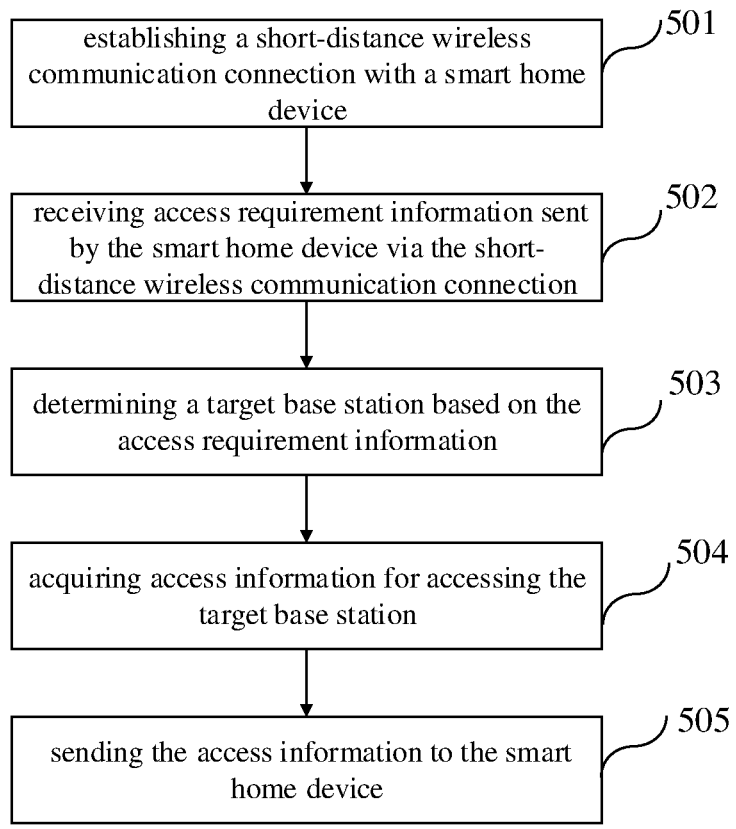
FIG. 5 is a flowchart illustrating a method for accessing a network according to an example embodiment.

With reference to FIG. 5, FIG. 5 is a flowchart illustrating a method for accessing a network according to an example embodiment. As illustrated in FIG. 5, the method for accessing a network may be applied in the system shown in FIG. 2 and executed by the terminal 210 in FIG. 2. The method may include the followings.

In step 501, a short-distance wireless communication connection is established with a smart home device.

In step 502, access requirement information sent by the smart home device is received via the short-distance wireless communication connection.

The access requirement information is configured to indicate a condition met by a base station to be accessed by the smart home device.

In step 503, a target base station is determined based on the access requirement information.

In step 504, access information for accessing the target base station is acquired.

In step 505, the access information is sent to the smart home device.

The terminal sends the access information to the smart home device so that the smart home device may initiate a random access to the target base station based on the access information.

Optionally, the terminal may establish the short-distance wireless communication connection with the smart home device as follows. An identification of the smart home device and connection verification information provided by the smart home device are acquired via an out-of-band communication mode. The out-of-band communication mode includes any communication mode other than the cellular mobile communication mode. A connection request containing the connection verification information is sent to the smart home device based on the identification of the smart home device, so as to establish the short-distance wireless communication connection with the smart home device.

Optionally, the identification of the smart home device and the connection verification information provided by the smart home device can be acquired via the out-of-band communication mode as follows. The identification of the smart home device and the connection verification information provided by the smart home device are acquired via a near field communication (NFC) or Bluetooth (BT). Or an encoded image displayed on the smart home device is scanned and recognized to obtain the identification of the smart home device and the connection verification information.

Optionally, the target base station can be determined based on the access requirement information as follows. Base station information of each base station within a cellular mobile communication range is acquired. Base stations having the base station information matching the access requirement information are selected from the base stations within the cellular mobile communication range as candidate base stations. The target base station is determined from the candidate base stations.

Optionally, when the candidate base stations include at least two base stations, the terminal may determine the target base station from the candidate base stations as follows. The base station having an optimum signal quality in the at least two base stations is determined as the target base station. Or, the at least two base stations are sequenced based on a signal quality in an order from highest to lowest to obtain a queue of base stations and each of first N base stations in the queue of base stations is determined as the target base station. N is an integer greater than or equal to 2.

In conclusion, after the short-distance wireless communication is established between the smart home device and the terminal, the terminal receives the access requirement information sent by the smart home device via the short-distance wireless communication, determines the target base station based on the access requirement information, acquires the access information for accessing the target base station and sends the access information to the smart home device, so that the smart home device initiates the random access to the target base station based on the access information and the smart home device may access the cellular mobile network. In the present disclosure, the terminal provides the access information for accessing the base station to the smart home device, so that the smart home device may initiate the random access to the base station, and information interaction may be realized between the smart home device and the base station via the cellular mobile communication mode, thus meeting a communication requirement of the smart home device.

In a possible implementation, a smart home device accesses to the cellular mobile network via communication between the smart home device and a terminal. Technical solutions shown in FIG. 3, FIG. 4 and FIG. 5 will be described herein in detail.

Figure 6:
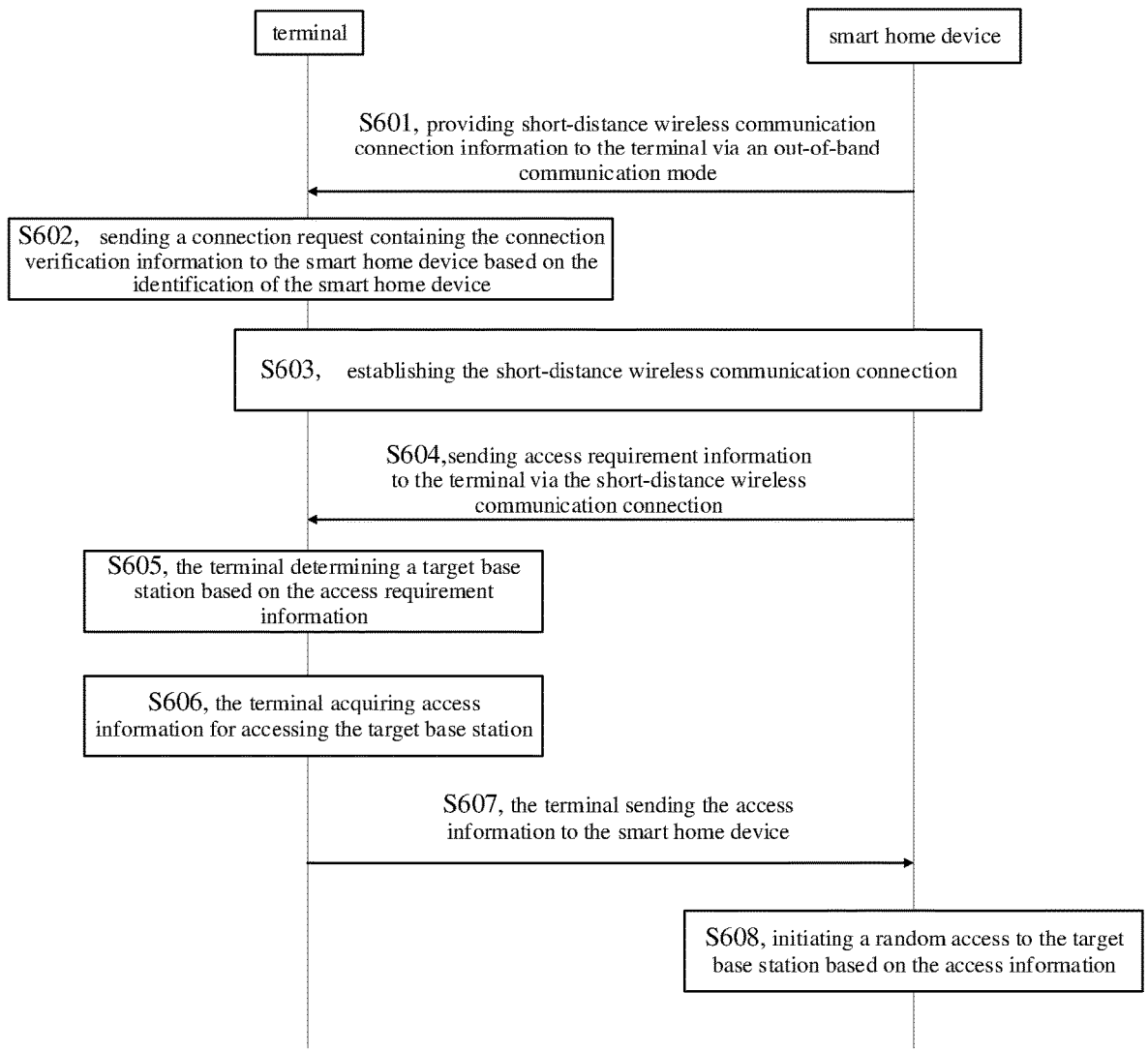
FIG. 6 is a flowchart illustrating a method for accessing a network according to an example embodiment.

With reference to FIG. 6, FIG. 6 is a flowchart illustrating a method for accessing a network according to an example embodiment. As illustrated in FIG. 6, the method for accessing a network may be applied in the system shown in FIG. 2. The method may include the followings.

In step 601, the smart home device provides short-distance wireless communication connection information to the terminal via an out-of-band communication mode. The short-distance wireless communication connection information contains an identification of the smart home device and connection verification information.

The out-of-band communication mode includes any communication mode other than the cellular mobile communication mode.

Optionally, the out-of-band communication mode may be a near field communication (NFC) or Bluetooth (BT) mode. The smart home device sends the short-distance wireless communication connection information containing the identification of the smart home device and the connection verification information to the terminal via the NFC or BT.

In detail, in a possible implementation, for example, the NFC is taken as the out-of-band communication mode, in a passive mode, after the terminal (also called as initiating device) enables the NFC function, a radio-frequency field is provided during the whole communication. The radio-frequency field may adopt a transmission rate from 106 kbps, 212 kbps, and 424 kbps. Correspondingly, the smart home device (also called as target device) needs not to generate a radio-frequency field, but can use a load modulation technology to send the short-distance wireless communication connection information to the initiating device at the same transmission rate. In an active mode, the terminal and the smart home device may generate their respective radio-frequency fields which may be used for communication between the terminal and the smart home device, such that the terminal may acquire the short-distance wireless communication connection information. Since the active mode has the same effect as the passive mode, its principle is not described herein.

Or the smart home device may display an encoded image containing the connection verification information, so that the terminal may recognize the encoded image to obtain the identification of the smart home device and the connection verification information.

The above encoded image may be an image which may carry information, such as a two-dimensional code image or a barcode image. In a possible implementation, for example, the smart home device displays a two-dimensional code containing the connection verification information, a user may recognize the two-dimensional code displayed on the smart home device through an application of scanning a two-dimensional code that is installed on the terminal, such that the terminal may obtain the short-distance wireless communication connection information containing the identification of the smart home device and the connection verification information.

For example, the smart home device includes a display screen. In this step, the smart home device may display the two-dimensional code containing the short-distance wireless communication connection information on the display screen. The user opens the application of scanning a two-dimensional code in the terminal, scans the two-dimensional code displayed on the display screen through an image acquisition component (such as a camera) in the terminal, so as to recognize the short-distance wireless communication connection information contained in the two-dimensional code.

Or, the above encoded image may be displayed by means of an entity. For example, the encoded image may be a tag attached to a shell, a package, a specification or a warranty card of the smart home device. The user opens the application of scanning a two-dimensional code in the terminal, scans the two-dimensional code in the tag through an image acquisition component (such as a camera) in the terminal, so as to recognize the short-distance wireless communication connection information contained in the two-dimensional code.

Optionally, in addition to the identification of the smart home device and the connection verification information, the short-distance wireless communication connection information may further contain a type of the smart home device, a communication capacity of the smart home device and other information.

In step 602, the terminal sends a connection request containing the connection verification information to the smart home device based on the identification of the smart home device.

Correspondingly, the smart home device receives the connection request sent by the terminal.

The short-distance wireless communication connection may include a Wi-Fi connection, a ZigBee connection, an NFC connection, an ultra-wideband (UWB) connection and so on.

Optionally, the terminal may determine a type of the short-distance wireless communication connection to be established with the smart home device based on a short-distance wireless communication after acquiring the short-distance wireless communication connection information. For example, the terminal may determine the type of the short-distance wireless communication connection corresponding to the identification of the smart home device and the connection verification information based on information such as the type of the smart home device and/or the communication capability of the smart home device contained in the short-distance wireless communication connection information. For example, when the type of the smart home device indicates that the smart home device is a device supporting a WLAN connection, or the communication capability of the smart home device indicates that the smart home device has a WLAN access capability, the terminal may determine that the Wi-Fi connection may be established with the smart home device.

Or, in another implementation, when the short-distance wireless communication connection information does not contain information such as the type of the smart home device and/or the communication capability of the smart home device, the terminal may determine that the type of the short-distance wireless communication connection to be established with the smart home device is a default type. For example, by default, the Wi-Fi connection may be established with the smart home device based on the identification of the smart home device and the connection verification information.

The terminal may send the connection request to the smart home device based on the identification of the smart home device after determining the type of the short-distance wireless communication connection to be established with the smart home device.

For example, the short-distance wireless communication connection is the Wi-Fi connection, the terminal may search for a broadcast signal of a surrounding WLAN access point after acquiring the identification of the smart home device and the connection verification information, compares a service set identifier (SSID) carried in the broadcast signal with the identification of the smart home device, determines that the WLAN access point is the smart home device if the SSID and the identification are consistent with each other, and sends the connection request to the smart home device.

In step 603, the smart home device establishes the short-distance wireless communication connection with the terminal when receiving the connection request containing the connection verification information sent by the terminal.

After receiving the connection request sent by the terminal, the smart home device detects whether the connection request contains the correct connection verification information, and establishes the short-distance wireless communication connection with the terminal when detecting that the connection request contains the correct connection verification information.

In step 604, the smart home device sends access requirement information to the terminal via the short-distance wireless communication connection. The terminal receives the access requirement information via the short-distance wireless communication connection.

The access requirement information is configured to indicate a condition met by a base station to be accessed by the smart home device.

Optionally, the smart home device sends an access information acquiring request to the terminal when detecting that the short-distance wireless communication connection is established.

The access information acquiring request contains the access requirement information.

In detail, in a possible implementation, when the smart home device detects that the short-distance wireless communication is completed between itself and the terminal, the smart home device may actively sends the access requirement information to the connected terminal via the connection. The access requirement information includes at least one of a business type of the smart home device, a quality of service (QoS) requirement of the smart home device and a type of a network accessible by the smart home device.

Optionally, the business types may be classified based on a type of data transmitted between the smart home device and the network. For example, the business types may include a video monitoring business, a speech transmitting business, a smart scene controlling business or the like. Or, the business types may be classified based on an interaction requirement of information interaction between the smart home device and the network. For example, the business types may include a first business requiring high speed transmission, a second business requiring high reliable transmission, a third business requiring low latency transmission and so on.

Optionally, the type of the network accessible by the smart home device can be categorized based on the application scene. For example, the type of the network accessible by the smart home device can be categorized as a first type network applicable to an enhance mobile broadband (eMBB) scene, a second type network applicable to a massive machine type of communication (mMTC) scene, a third type network applicable to an ultra-reliable && low latency communication scene or the like.

For example, in the internal of the smart home device, a program instruction that may send the access requirement information of the smart home device are preconfigured, with an establishment of the short-distance wireless communication connection as a condition. When the smart home device detects that the short-distance wireless communication connection is established, the smart home device is triggered to execute the program instruction, so as to send the access requirement information of the smart home device to the connected terminal via the short-distance wireless communication connection. The preconfigured program instruction may be set by a developer or an operator in advance.

In step 605, the terminal determines a target base station based on the access requirement information.

Optionally, the terminal acquires base station information of each base station within the cellular mobile communication range, selects base stations having the base station information matching the access requirement information from the base stations within a cellular mobile communication range as candidate base stations, and determines the target base station from the candidate base stations.

The terminal may perform cell synchronization with each surrounding base station, acquires information carried in a mater information block (MIB) and/or at least one system information block (SIB) in a signal sent by each surrounding base station, and acquires the base station information based on the acquired information. Optionally, the base station information may include, but be not limited to, a cell identification of the base station, a type of a business provided by the base station, a QoS requirement met by the base station, a type of a network to which the base station belongs, and so on.

In a possible implementation, for example, the access requirement information sent by the smart home device is the QoS requirement of the smart home device, the terminal receives the QoS requirement sent by the smart home device, acquires the base station information of each base station within the cellular mobile communication range of itself, screens the base stations based on the base station information to acquire base stations meeting the QoS requirement of the smart home device as candidate base stations, and determines the target base station from the candidate base stations.

Optionally, when the candidate base stations include at least two base stations, the target base station is determined from the candidate base stations as follows. The base station having an optimum signal quality in the at least two base stations is determined as the target base station. Or, the at least two base stations are sequenced based on a signal quality in an order from highest to lowest to obtain a queue of base stations and each of first N base stations in the queue of base stations is determined as the target base station, where N is an integer greater than or equal to 2.

In detail, for example, the target base station is selected based on the signal quality of the base station, when the candidate base stations include at least two base stations, the terminal screens out the base station having the optimum signal quality based on the signal quality of the base station contained in the detected base station information, and determines the base station having the optimum signal quality as the target base station. In another possible implementation, the terminal screens out N target base stations, where N is an integer greater than or equal to 2. The terminal sequences the candidate base stations based on a signal quality in an order from highest to lowest to obtain a queue of base stations and determines each of first N base stations in the queue of base stations as the target base station. N can be set by the developer or an operator in advance.

In step 606, the terminal acquires access information for accessing the target base station.

Optionally, the access information contains a preamble code of the random access. Or, the access information contains a preamble code of the random access and a safety secret key for establishing a connection channel with a core network.

In step 607, the terminal sends the access information to the smart home device via the short-distance wireless communication connection.

In step 608, the smart home device initiates a random access to the target base station based on the access information.

In detail, after determining the target base station, the terminal may acquire the access information for accessing the target base station. In a possible implementation, for example, the access information is a preamble code of the random access, when the random access adopts a non-competition-based random access mode, the preamble code of the random access is allocated by the target base station. The terminal may acquire the preamble code allocated by the base station and send the preamble code to the smart home device via the short-distance wireless communication connection. The smart home device may initiate the random access to the base station automatically after receiving the preamble code. The procedure of the base station making consequent response and completing the random access is similar to the non-competition-based random access procedure shown in FIG. 1, which is not described here. Of course, when there are N target base stations, the terminal may acquire the preamble codes randomly allocated by a plurality of base stations, and sends these preamble codes to the smart home device. When the smart home device receives multiple preamble codes, the smart home device selects the preamble code allocated by one target base station and initiates the random access to the target base station. Other preamble codes may be stored in the smart home device for consequent use in situations that the access is failed or the access is required.

When the random access adopts a competition-based random access mode, the preamble code of the random access is a preamble code randomly selected by the terminal from a preamble code resource pool. In this case, the terminal sends the acquired preamble code to the smart home device. The smart home device initiates the random access to the target base station in the competition-based random access mode after acquiring the preamble code and the safety secret key carried in the access information. Likely, the procedure of the base station making consequent response and completing the random access is similar to the competition-based random access procedure shown in FIG. 1, which is not described here.

When the access information further includes the safety secret key for establishing a connection channel with a core network, the smart home device may further establish the connection channel with the core network based on the safety secret key.

In conclusion, after the short-distance wireless communication is established between the smart home device and the terminal, the terminal receives the access requirement information sent by the smart home device, determines the target base station based on the access requirement information and sends the access information for accessing the target base station to the smart home device, the smart home device initiates the random access to the target base station based on the access information such that the smart home device may access the cellular mobile network. In the present disclosure, the terminal provides the access information for accessing the base station to the smart home device, so that the smart home device may initiate the random access to the base station, and information interaction may be realized between the smart home device and the base station via the cellular mobile communication mode, thus meeting a communication requirement of the smart home device.

Figure 7:
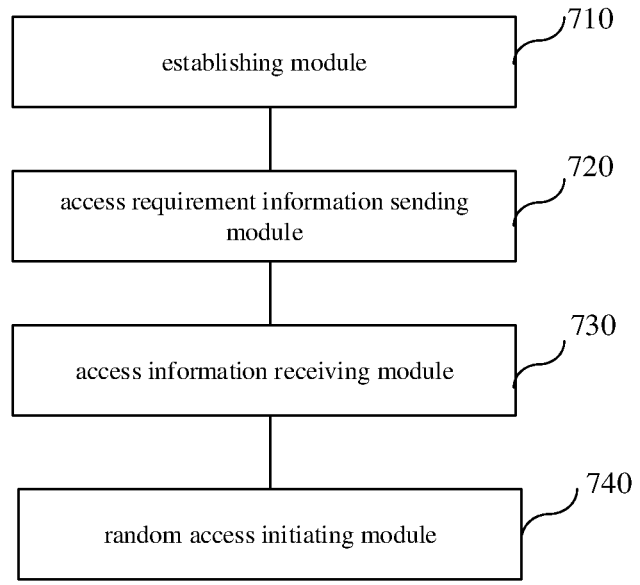
FIG. 7 is a block diagram illustrating an apparatus for accessing a network according to an example embodiment.

With reference to FIG. 7, FIG. 7 is a block diagram illustrating an apparatus for accessing a cellular mobile network according to an example embodiment. As illustrated in FIG. 7, the apparatus may be implemented as a part or all of a smart home device in an implementation environment shown in FIG. 2 through software, hardware or a combination thereof, to execute the steps executed by the smart home device described in any embodiment shown in FIG. 4 or FIG. 6. The apparatus may include an establishing module 710, an access requirement information sending module 720, an access information receiving module 730 and a random access initiating module 740.

The establishing module 710 is configured to establish a short-distance wireless communication connection with a terminal.

The access requirement information sending module 720 is configured to send access requirement information to the terminal via the short-distance wireless communication connection.

The access requirement information indicates a condition met by a base station to be accessed by the smart home device.

The access information receiving module 730 is configured to receive access information for accessing a target base station sent by the terminal, in which the target base station is a base station determined by the terminal based on the access requirement information.

The random access initiating module 740 is configured to initiate a random access to the target base station based on the access information.

Optionally, the establishing module 710 is configured to provide an identification of the smart home device and connection verification information to the terminal in an out-of-band communication mode, in which the out-of-band communication mode includes any communication mode other than a cellular mobile communication mode. And the establishing module 710 is configured to establish the short-distance wireless communication connection with the terminal when receiving a connection request containing the connection verification information sent by the terminal.

Optionally, when providing the identification of the smart home device and the connection verification information to the terminal in the out-of-band communication mode, the establishing module 710 is configured to send the identification of the smart home device and the connection verification information to the terminal via a near field communication (NFC) or Bluetooth (BT), or display an encoded image containing the connection verification information so that the terminal recognizes the encoded image to acquire the identification of the smart home device and the connection verification information.

Optionally, the access requirement information sending module 720 is configured to send an access information acquiring request to the terminal when detecting that the short-distance wireless communication connection is established, in which the access information acquiring request contains the access requirement information.

Optionally, the access requirement information includes at least one of a business type of the smart home device, a quality of service (QoS) requirement of the smart home device and a type of a network accessible by the smart home device.

Optionally, the access information contains a preamble code of the random access and a safety secret key for establishing a connection channel with a core network, or the access information contains a preamble code of the random access.

Figure 8:
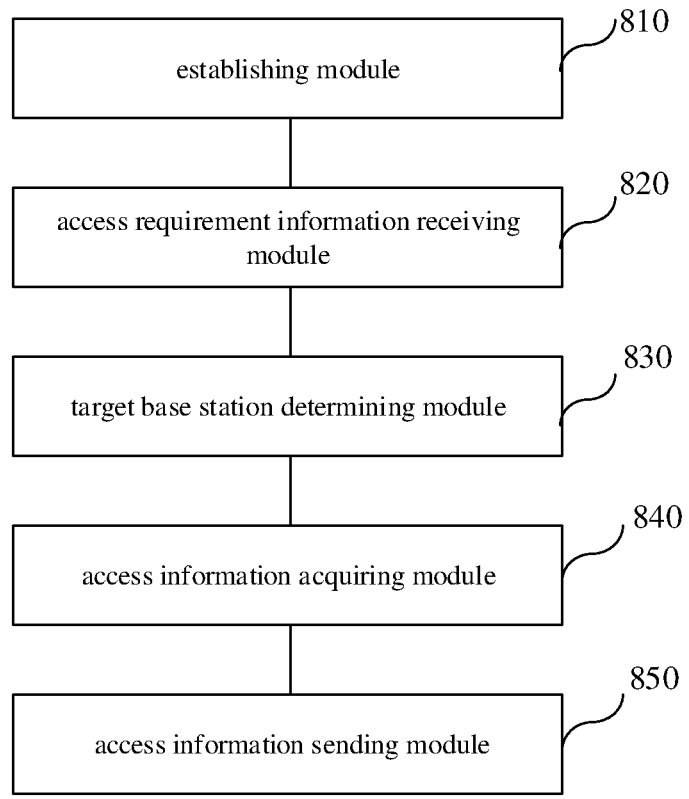
FIG. 8 is a block diagram illustrating an apparatus for accessing a network according to an example embodiment.

With reference to FIG. 8, FIG. 8 is a block diagram illustrating an apparatus for accessing a cellular mobile network according to an example embodiment. As illustrated in FIG. 8, the apparatus may be implemented as a part or all of a terminal in an implementation environment shown in FIG. 2 through software, hardware or a combination thereof, to execute the steps executed by the terminal described in any embodiment shown in FIG. 5 or FIG. 6. The apparatus may include an establishing module 810, an access requirement information receiving module 820, a target base station determining module 830, an access information acquiring module 840 and an access information sending module 850.

The establishing module 810 is configured to establish a short-distance wireless communication connection with a smart home device.

The access requirement information receiving module 820 is configured to receive access requirement information sent by the smart home device via the short-distance wireless communication connection, in which the access requirement information indicates a condition met by a base station to be accessed by the smart home device.

The target base station determining module 830 is configured to determine a target base station based on the access requirement information.

The access information acquiring module 840 is configured to acquire access information for accessing the target base station.

The access information sending module 850 is configured to send the access information to the smart home device so that the smart home device initiates a random access to the target base station based on the access information.

Optionally, the establishing module 810 is configured to acquire an identification of the smart home device and connection verification information provided by the smart home device in an out-of-band communication mode, in which the out-of-band communication mode includes any communication mode other than a cellular mobile communication mode. And the establishing module 810 is configured to send a connection request containing the connection verification information to the smart home device based on the identification of the smart home device, so as to establish the short-distance wireless communication connection with the smart home device.

Optionally, when acquiring the identification of the smart home device and the connection verification information provided by the smart home device in the out-of-band communication mode, the establishing module 810 is configured to acquire the identification of the smart home device and the connection verification information provided by the smart home device via a near field communication (NFC) or Bluetooth (BT), or the establishing module 810 is configured to scan and recognize an encoded image displayed on the smart home device to acquire the identification of the smart home device and the connection verification information.

Optionally, the target base station determining module 830 is configured to acquire base station information of each base station within a cellular mobile communication range, select base stations having the base station information matching the access requirement information from the base stations within the cellular mobile communication range as candidate base stations and determine the target base station from the candidate base stations.

Optionally, when the candidate base stations comprise at least two base stations, the target base station determining module 830 is configured to determine the base station having an optimum signal quality from the at least two base stations as the target base station, or the target base station determining module 830 is configured to sequence the at least two base stations based on a signal quality in an order from highest to lowest to obtain a queue of base stations and determine each of first N base stations in the queue of base stations as the target base station, where N is an integer greater than or equal to 2.

It should be noted that, the apparatus provided by the embodiments of the present disclosure are described based on the above division of functional modules when the apparatus implements its functionalities. In practical application, the above functionalities may be allocated to different functional modules according to requirements, i.e., the apparatus can be divided into different functional modules, so as to complete all or part of functionalities described above.

With regard to the above described apparatus embodiments, the specific details that the modules perform the operations have been descried in the method embodiments, which are not described in detail here.

The embodiments of the present disclosure further provide a network access system, including a smart home device and a terminal. The smart home device includes the apparatus for accessing a network shown in FIG. 7. The terminal includes the apparatus for accessing a network shown in FIG. 8.

The embodiments of the present disclosure further provide an apparatus for accessing a cellular mobile network which may execute all or part of the steps executed by the smart home device described in any embodiment shown in FIG. 3, FIG. 4 or FIG. 6 of the present disclosure. The apparatus may include a processor and memory configured to store instructions executable by the processor.

The processor is configured to establish a short-distance wireless communication connection with a smart home device, receive access requirement information sent by the smart home device via the short-distance wireless communication connection, in which the access requirement information indicates a condition met by a base station to be accessed by the smart home device, determine a target base station based on the access requirement information, acquire access information for accessing the target base station, and send the access information to the smart home device so that the smart home device initiates a random access to the target base station based on the access information.

Optionally, establishing the short-distance wireless communication connection with the terminal includes providing an identification of the smart home device and connection verification information to the terminal in an out-of-band communication mode, in which the out-of-band communication mode includes any communication mode other than a cellular mobile communication mode, and establishing the short-distance wireless communication connection with the terminal when receiving a connection request containing the connection verification information sent by the terminal.

Optionally, providing the identification of the smart home device and the connection verification information to the terminal in the out-of-band communication mode includes sending the identification of the smart home device and the connection verification information to the terminal via a near field communication (NFC) or Bluetooth (BT), or displaying an encoded image containing the connection verification information so that the terminal recognizes the encoded image to acquire the identification of the smart home device and the connection verification information.

Optionally, sending the access requirement information to the terminal via the short-distance wireless communication connection includes sending an access information acquiring request to the terminal when detecting that the short-distance wireless communication connection is established, in which the access information acquiring request contains the access requirement information.

Optionally, the access requirement information includes at least one of a business type of the smart home device, a quality of service (QoS) requirement of the smart home device and a type of a network accessible by the smart home device.

Optionally, the access information contains a preamble code of the random access and a safety secret key for establishing a connection channel with a core network, or the access information contains a preamble code of the random access.

The embodiments of the present disclosure further provide an apparatus for accessing a cellular mobile network which may execute all or part of the steps executed by the terminal described in any embodiment shown in FIG. 3, FIG. 5 or FIG. 6 of the present disclosure. The apparatus may include a processor and memory configured to store instructions executable by the processor.

The processor is configured to perform operations of: establishing a short-distance wireless communication connection with a smart home device, receiving access requirement information sent by the smart home device via the short-distance wireless communication connection, in which the access requirement information indicates a condition met by a base station to be accessed by the smart home device, determining a target base station based on the access requirement information, acquiring access information for accessing the target base station, and sending the access information to the smart home device so that the smart home device initiates a random access to the target base station based on the access information.

Optionally, acquiring the identification of the smart home device and the connection verification information provided by the smart home device in the out-of-band communication mode includes acquiring the identification of the smart home device and the connection verification information provided by the smart home device via a near field communication (NFC) or Bluetooth (BT), or acquiring the identification of the smart home device and the connection verification information provided by the smart home device in the out-of-band communication mode includes scanning and recognizing an encoded image displayed on the smart home device to acquire the identification of the smart home device and the connection verification information.

Optionally, determining the target base station based on the access requirement information includes acquiring base station information of each base station within a cellular mobile communication range, selecting base stations having the base station information matching the access requirement information from the base stations within the cellular mobile communication range as candidate base stations and determining the target base station from the candidate base stations.

Optionally, when the candidate base stations include at least two base stations, determining the target base station from the candidate base stations includes determining the base station having an optimum signal quality from the at least two base stations as the target base station, or determining the target base station from the candidate base stations includes sequencing the at least two base stations based on a signal quality in an order from highest to lowest to obtain a queue of base stations and determining each of first N base stations in the queue of base stations as the target base station, where N is an integer greater than or equal to 2.

The technical solution of the present disclosure is described by mainly taking a terminal and a server as an example. It should be noted that, in order to implement the above described functionalities, the terminal and the server include corresponding hardware structures and/or software modules for performing the functionalities. In combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Figure 9:
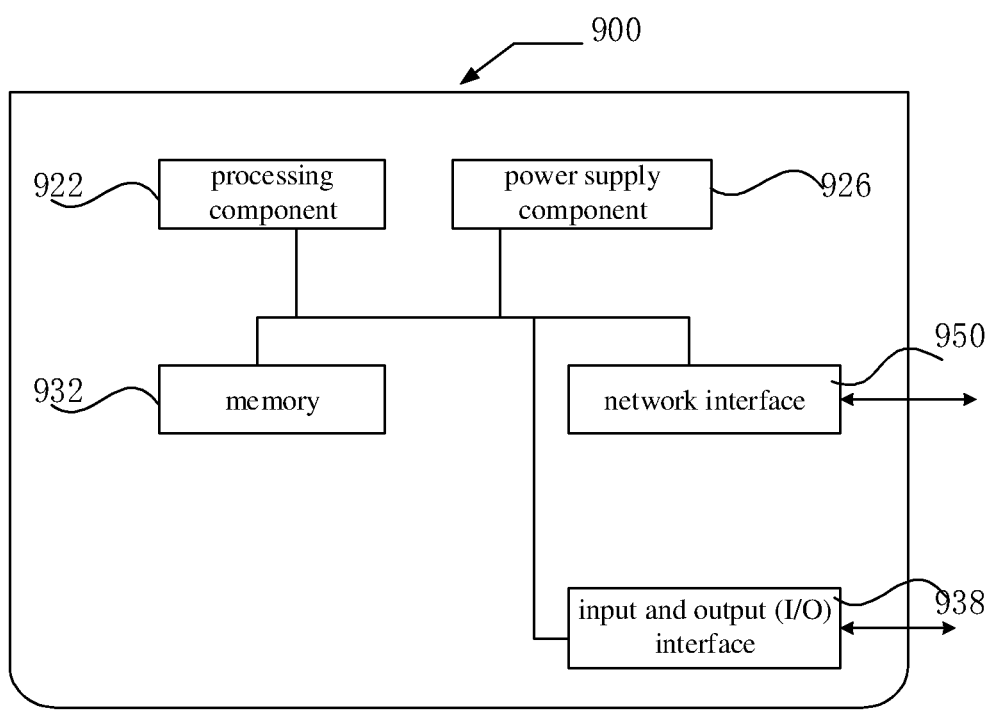
FIG. 9 is a block diagram illustrating an apparatus for accessing a network according to an example embodiment.

FIG. 9 is a block diagram illustrating an apparatus 900 for accessing a cellular mobile network according to an example embodiment. For example, the apparatus 900 may be provided as a terminal or a smart home device. Referring to FIG. 9, the apparatus 900 may include a processing component 922, which further includes one or more processors, and a memory resource represented by memory 932 for storing instructions executable by the processing component 922, such as application programs. The application program stored in the memory 932 may include one or more modules each corresponding to a set of instructions. In addition, the processing component 922 is configured to execute instructions to perform the above method for accessing a network, or all or part of the steps executed by the terminal or the smart home device.

The apparatus 900 may further include a power supply component 926 configured to perform power management of the apparatus 900, a wired or wireless network interface 950 configured to connect the apparatus 900 to the network, and an input and output (I/O) interface 938. The apparatus 900 could operate based on an operating system stored in the memory 932, such as Windows Server™, Mac OS X™, Unix™, Linux™, FreeBSD™ or the like.

It would be understood by those skilled in the art that, in the above one or more examples, the functionalities described in the embodiments of the present disclosure may be realized by hardware, software, firmware or combinations thereof. If the functionalities are achieved by software, these functionalities may be stored in a computer readable medium or used as one or more instructions or codes in the computer readable medium for transmission. The computer readable medium may include a computer storage medium and a computer communication medium. The communication medium includes any medium for transmitting computer programs from one place to another place. The storage medium may be any available medium accessible by a general or dedicated computer.

The embodiments of the present disclosure further provide a computer storage medium for storing computer software instructions used by the terminal or the smart home device described above, which includes programs designed for executing the above method for accessing a network.

Those skilled in the art will easily think of other embodiments of the present disclosure after considering the specification and practicing the present disclosure. This application is intended to cover any variations, uses, or adaptive changes of the present disclosure. These variations, uses, or adaptive changes follow the general principles of the present disclosure and include common knowledge or conventional technical means in the technical field not disclosed in the present disclosure. The description and the embodiments are only regarded as exemplary, and the true scope and spirit of the present disclosure are pointed out by the appended claims.

It should be understood that the present disclosure is not limited to the precise structure that has been described above and shown in the drawings, and various modifications and changes may be made without departing from its scope. The scope of the present disclosure is only limited by the appended claims.

What is claimed is:

1. A method for accessing a network, comprising:
    establishing a short-distance wireless communication connection between a smart home device and a terminal;
    sending, by the smart home device, access requirement information to the terminal via the short-distance wireless communication connection, wherein the access requirement information indicates a condition met by a base station to be accessed by the smart home device;
    determining, by the terminal, a target base station based on the access requirement information;
    acquiring, by the terminal, access information for accessing the target base station;
    sending, by the terminal, the access information to the smart home device; and
    initiating, by the smart home device, a random access to the target base station based on the access information.

2. The method of claim 1, wherein the random access includes a competition-based random access procedure and a non-competition-based random access procedure.

3. A method for accessing a network, executed by a smart home device, comprising:
    establishing a short-distance wireless communication connection with a terminal;
    sending access requirement information to the terminal via the short-distance wireless communication connection, wherein the access requirement information indicates a condition met by a base station to be accessed by the smart home device;
    receiving access information for accessing a target base station sent by the terminal, wherein the target base station is determined by the terminal based on the access requirement information; and
    initiating a random access to the target base station based on the access information.

4. The method of claim 3, wherein establishing the short-distance wireless communication connection with the terminal comprises:
    providing an identification of the smart home device and connection verification information to the terminal in an out-of-band communication mode, wherein the out-of-band communication mode includes any communication mode other than a cellular mobile communication mode; and
    establishing the short-distance wireless communication connection with the terminal when receiving a connection request containing the connection verification information sent by the terminal.

5. The method of claim 4, wherein providing the identification of the smart home device and the connection verification information to the terminal in the out-of-band communication mode comprises:
    sending the identification of the smart home device and the connection verification information to the terminal via a near field communication (NFC) or Bluetooth (BT); or
    displaying an encoded image containing the connection verification information so that the terminal recognizes the encoded image to acquire the identification of the smart home device and the connection verification information.

6. The method of claim 3, wherein sending the access requirement information to the terminal via the short-distance wireless communication connection comprises:
    sending an access information acquiring request to the terminal in response to detecting that the short-distance wireless communication connection is established, wherein the access information acquiring request contains the access requirement information.

7. The method of claim 3, wherein the access requirement information comprises at least one of a business type of the smart home device, a quality of service (QoS) requirement of the smart home device and a type of a network accessible by the smart home device.

8. The method of claim 3, wherein the access information contains a preamble code of the random access and a safety secret key for establishing a connection channel with a core network, or the access information contains a preamble code of the random access.

9. A smart home device, comprising:
    a processor; and
    a memory configured to store instructions executable by the processor;
    wherein the processor is configured to perform the method of claim 3.

10. A method for accessing a network, executed by a terminal, the method comprising:
    establishing a short-distance wireless communication connection with a smart home device;
    receiving access requirement information sent by the smart home device via the short-distance wireless communication connection, wherein the access requirement information indicates a condition met by a base station to be accessed by the smart home device;
    determining a target base station based on the access requirement information;
    acquiring access information for accessing the target base station; and
    sending the access information to the smart home device so that the smart home device initiates a random access to the target base station based on the access information.

11. The method of claim 10, wherein establishing the short-distance wireless communication connection with the smart home device comprises:
    acquiring an identification of the smart home device and connection verification information provided by the smart home device in an out-of-band communication mode, wherein the out-of-band communication mode includes any communication mode other than a cellular mobile communication mode; and
    sending a connection request containing the connection verification information to the smart home device based on the identification of the smart home device, to establish the short-distance wireless communication connection with the smart home device.

12. The method of claim 11, wherein acquiring the identification of the smart home device and the connection verification information provided by the smart home device in the out-of-band communication mode comprises one of:
    acquiring the identification of the smart home device and the connection verification information provided by the smart home device via a near field communication (NFC) or Bluetooth (BT); or
    scanning and recognizing an encoded image displayed on the smart home device to acquire the identification of the smart home device and the connection verification information.

13. The method of claim 10, wherein determining the target base station based on the access requirement information comprises:
    acquiring base station information of each base station within a cellular mobile communication range;

selecting base stations having the base station information matching the access requirement information from the base stations within the cellular mobile communication range as candidate base stations; and determining the target base station from the candidate base stations.

14. The method of claim 13, wherein when the candidate base stations include at least two base stations, determining the target base station from the candidate base stations comprises one of:

determining a base station having an optimum signal quality from the at least two base stations as the target base station; or sequencing the at least two base stations based on a signal quality in an order from highest to lowest to obtain a queue of base stations and determining each of first N base stations in the queue of base stations as the target base station, where N is an integer greater than or equal to 2.

15. A terminal, comprising:

a processor; and a memory configured to store instructions executable by the processor;

wherein the processor is configured to perform the method of claim 10.

* * * * *